United States Patent [19]

Takasu et al.

[11] Patent Number: 4,517,146
[45] Date of Patent: May 14, 1985

[54] METHOD FOR CONTROLLING TIRE VULCANIZATION

[75] Inventors: Ryo Takasu, Kodaira; Makoto Nakao, Higashimurayama, both of Japan

[73] Assignee: Bridgestone Tire Co., Ltd., Tokyo, Japan

[21] Appl. No.: 537,607

[22] Filed: Sep. 30, 1983

[30] Foreign Application Priority Data

Oct. 1, 1982 [JP] Japan ................................ 57-172697

[51] Int. Cl.³ .............................................. B29H 5/02
[52] U.S. Cl. ................... 264/40.6; 264/315; 264/326; 425/29; 425/143
[58] Field of Search ...................... 264/40.6, 315, 326, 264/236, 347, 40.1; 425/29, 30, 36, 143, 144

[56] References Cited

U.S. PATENT DOCUMENTS

| | | | |
|---|---|---|---|
| 2,385,143 | 9/1945 | Levine | 264/347 |
| 3,649,729 | 3/1972 | Davis et al. | 264/326 |
| 3,732,488 | 6/1973 | Porter et al. | 264/347 |
| 3,792,145 | 2/1974 | Hugger et al. | 264/236 |
| 3,819,915 | 6/1974 | Smith | 264/326 |
| 4,069,286 | 1/1978 | Greenhalgh | 264/347 |
| 4,344,142 | 8/1982 | Diehr et al. | 425/30 |
| 4,371,483 | 2/1983 | Mattson | 264/40.6 |

Primary Examiner—J. Howard Flint, Jr.
Attorney, Agent, or Firm—Sughrue, Mion, Zinn, Macpeak & Seas

[57] ABSTRACT

In a method for controlling a tire vulcanization of a vulcanizing apparatus, an initial green tire temperature is measured before vulcanization and a tire temperature during vulcanization is estimated on the basis of the thus measured initial tire temperature. In addition, a sum of products of vulcanizing rates derived from the thus estimated tire temperature is calculated so as to stop the tire vulcanization when the sum of products of vulcanizing rates becomes equal to a predetermined value. Therefore, the vulcanizing rate controlling can be performed in an easy and accurate manner without measuring the tire temperature during vulcanization, and thus a trace of a thermometer insertion is not remained on the vulcanized tire surface.

6 Claims, 3 Drawing Figures

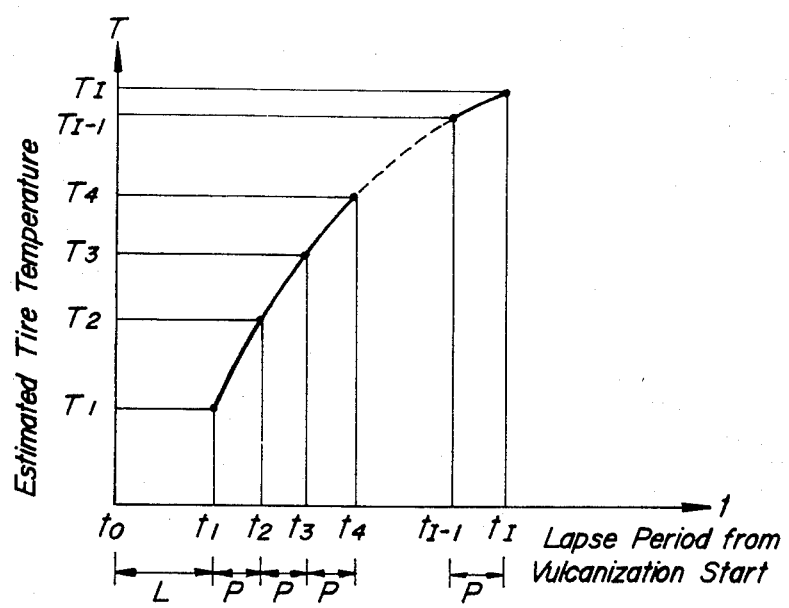
FIG_1
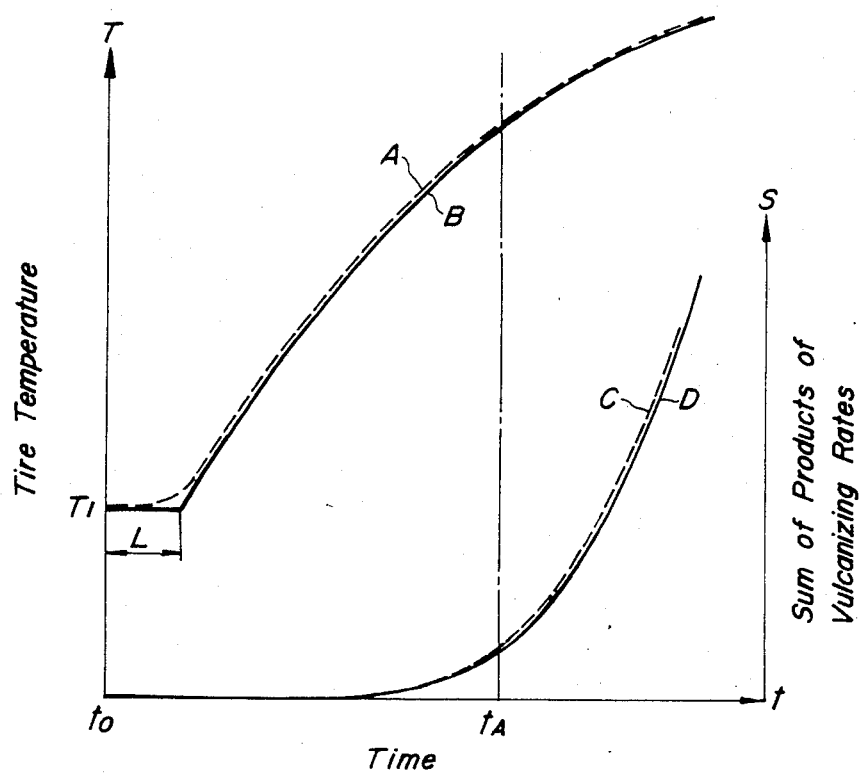
FIG_2

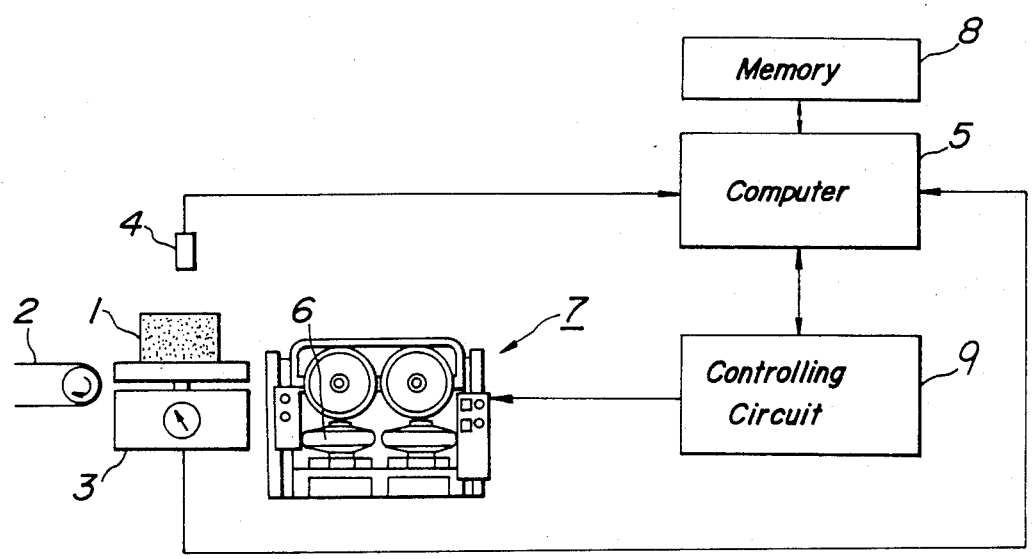
FIG_3

METHOD FOR CONTROLLING TIRE VULCANIZATION

BACKGROUND OF THE INVENTION

The present invention relates to a method for controlling a tire vulcanization, and especially relates to a method for stopping the vulcanization when sum of products of vulcanizing rates obtained on the basis of a tire temperature is equal to a predetermined value.

In the tire industry, in order to produce a tire having stable characteristics, a vulcanization method which could vulcanize the tire sufficiently has been strongly required. As for a conventional method for controlling the tire vulcanization, various methods have been proposed, for example, in U.S. Pat. No. 3,819,915, U.S. patent application Ser. No. 143,966 filed on Apr. 24, 1981 and Japanese Patent Laid-Open Publication No. 27,737/82.

In a method disclosed in U.S. Pat. No. 3,819,915, the tire vulcanization is stopped when sum of products of vulcanizing rates calculated on the basis of measured tire temperature during the tire vulcanization reaches a predetermined value. However, according to this known method, since a thermometer which is easy to be damaged must be inserted into a tire inner portion maintained at high-temperature and high-pressure for detecting the tire temperature during the vulcanization, the vulcanizing apparatus becomes complicated in construction and requires difficult operation for maintenance and preservation thereof such as a repair of the thermometer. Moreover, in the vulcanizing apparatus, a vulcanizing chamber thereof must be changed corresponding to the types of tires to be vulcanized. In this case, it is necessary to again attach the thermometer to the vulcanizing chamber after it was detached from the previously used chamber, and thus the operations mentioned above become much more complicated. Further, according to the method mentioned above, since it is necessary to keep the thermometer in the inner portion of the tire until the vulcanization is finished, a trace of a thermometer insertion is remained in a surface of the vulcanized tire.

In order to eliminate the drawbacks mentioned above, according to the method disclosed in the Japanese Laid-Open Publication No. 27,737/82, the thermometer is pulled out of the tire in the course of the vulcanization without measuring the tire temperature until the end of the vulcanizing operation. However, according to such a method, since the tire temperature must be measured until about the middle of the vulcanizing period, there also remains the drawbacks mentioned above due to the temperature measurement under the high-temperature and high-pressure states.

Moreover, in the U.S. Ser. No. 143,966, there is disclosed a method for controlling the vulcanizing period by measuring the temperature on outer and inner surfaces of tire without measuring directly the temperature of the inner portion of tire during the vulcanizing operation. According to this known method, the trace of the thermometer insertion is not remained on the tire surface after the vulcanization. However, since it is necessary to measure the tire temperature of the outer and inner surfaces during the vulcanization, there still remain the drawbacks that the vulcanizing apparatus becomes complicated in construction and requires the troublesome operation for the maintenance and the preservation thereof. Further, since the method mentioned above is to determine a vulcanizing end time of the tire by assuming the tire temperature during the vulcanization on the basis of thermal inputs from the outer and inner surfaces of the tire, a large error occurs in the measurement of the thermal input and thus the vulcanizing rate can not be controlled accurately.

As mentioned above in detail, according to the conventional methods for controlling the tire vulcanization, it is necessary to measure the tire temperature actually during the vulcanizing operation and thus there occurs the drawback that the maintenance of the thermometer exposed in the high-temperature and high-pressure condition becomes very complicated.

SUMMARY OF THE INVENTION

The present invention has for its object to eliminate the drawbacks mentioned above and to propose a method for controlling a tire vulcanization which can control a vulcanizing rate in an easy and accurate manner without measuring a tire temperature during the vulcanization.

According to the invention, a method for controlling a tire vulcanization of a vulcanizing apparatus comprising the steps of:

measuring an initial temperature of a green tire before vulcanization;

estimating a tire temperature during vulcanization on the basis of said initial tire temperature;

calculating a sum of products of vulcanizing rates derived from said estimated tire temperature during vulcanization; and stopping said tire vulcanization when said sum of products of vulcanizing rates becomes equal to a predetermined value.

BRIEF DESCRIPTION OF THE DRAWINGS

FIG. 1 is a graph showing successive estimation steps of tire temperature according to the method for controlling a tire vulcanization of the present invention;

FIG. 2 is a graph illustrating a tire temperature estimated by the method according to the invention and a relation between sums of products of estimated vulcanizing rates and of an actual vulcanizing rate; and FIG. 3 is a schematic view depicting an embodiment of a vulcanizing apparatus for effecting the method according to the invention.

DESCRIPTION OF THE PREFERRED EMBODIMENTS

The present invention has been achieved by recognizing the fact that a tire temperature during the vulcanization can be estimated in a highly accurate manner only by measuring an initial tire temperature before the vulcanization, because an increase of the tire temperature during the vulcanization is largely dependent upon the tire temperature before the vulcanization.

One embodiment for effecting the tire temperature estimation on the basis of a first order lag equation will be explained.

In an automatic control theory, a transfer function $G(s)$ of first order lag element is given by the following well known equation, $$G(s) = K/(Ts+1) \qquad (1)$$

where K is a gain of the first order lag element, T is a time constant and s is a Laplacian.

Now, it is assumed that the vulcanizing apparatus is represented by a cascade connection of a zero-order hold element and a first order lag element, and a tire temperature y(t) at a time t is Z-transformed, then the tire temperature Y(Z) after Z transformation is obtained as follows, $$Y(Z) = (1 - Z^{-1}) \cdot z\left[\frac{1}{s} \cdot \frac{K}{Ts+1}\right] \quad (2)$$

where $Z = e^{sP}$ (P is a sampling period). If it is further assumed that $a = 1/T$, the equation (2) can be rewritten into the following equation.

$$Y(Z) = (1 - Z^{-1}) \cdot z\left[K \cdot \left(\frac{1}{s} - \frac{1}{s+a}\right)\right] \quad (3)$$

$$= (1 - Z^{-1}) \cdot K\left(\frac{1}{1 - Z^{-1}} - \frac{1}{1 - e^{-aP} \cdot Z^{-1}}\right)$$

$$= \frac{K \cdot Z^{-1} \cdot (1 - e^{-aP})}{1 - e^{-aP} \cdot Z^{-1}}$$

From the equation (3), the following equation is obtained.

$$Y(Z) - e^{-aP} \cdot Y(Z) \cdot Z^{-1} = K \cdot Z^{-1} \cdot (1 - e^{-aP})$$

By modifying the above equation, the following equation is further derived.

$$Y(Z) = e^{-aP} \cdot Y(Z) \cdot Z^{-1} + K \cdot (1 - e^{-aP}) \cdot Z^{-1} \quad (4)$$

Now, it is assumed that $e^{-aP} = A_1$, $K(1 - e^{-aP}) = A_2$. Then, when the equation (4) is inversely Z-transformed in the time domain while taking into mind that $Y(Z) \cdot Z^{-1} = y(t-P)$ and $A_2$ is a constant, the following equation is obtained.

$$y(t) = A_1 \cdot y(t-P) + A_2 \quad (5)$$

This equation (5) indicates that the tire temperature y(t) at any time t is determined by the previous tire temperature y(t−P) at the sampling time (t−P). Therefore, an increase in the tire temperature during the vulcanization can be successively estimated by measuring the initial tire temperature $T_1$ before the vulcanization.

Next, a method for determining parameters $A_1$ and $A_2$ in the equation (5) will be explained. At first, the tire temperature of a predetermined kind of tire during the vulcanization is actually measured at the sampling period (P) to obtain actual temperature data $y_1, y_2 \ldots y_N$. Then, these data are successively substituted for y(t) and y(t−P) in the equation (5) to derive the following N−1 equations.

$$\left.\begin{array}{l} y_2 = A_1 \cdot y_1 + A_2 \\ y_3 = A_1 \cdot y_2 + A_2 \\ \vdots \\ y_N = A_1 \cdot y_{N-1} + A_2 \end{array}\right\} \quad \ldots (6)$$

Here, if vectors Y, X and A are assumed as follows, $$Y = \begin{pmatrix} y_2 \\ y_3 \\ \vdots \\ y_N \end{pmatrix}, \quad X = \begin{pmatrix} y_1 & 1 \\ y_2 & 1 \\ \vdots & \vdots \\ y_{N-1} & 1 \end{pmatrix}, \quad A = \begin{pmatrix} A_1 \\ A_2 \end{pmatrix}$$

the equations (6) may be rewritten as follows.

$$Y = X \cdot A \quad (7)$$

If the vector A is approximated by the least squares method, the following equation is obtained, $$A = (X^T \cdot X)^{-1} \cdot X^T \cdot Y \quad (8)$$

where $X^T$ is a transpose of X and $(X^T \cdot X)^{-1}$ is an inverse matrix of $X^T \cdot X$. Therefore, the vector A i.e. the parameters $A_1$ and $A_2$ can be determined by the equation (8). However, in case of changing a temperature increasing rate of a heating medium during the vulcanization, an error between the estimated temperature and the actually measured one can be minimized by previously calculating the another parameters $A_1$ and $A_2$ and changing the initial parameters to them from the changing point.

As mentioned above in detail, since the parameters $A_1$ and $A_2$ for the temperature estimation are previously obtained corresponding to the kind of tires by actually measuring the tire temperature before the vulcanization, the tire temperature during the vulcanization can be estimated on the basis of the aforementioned equation (5) by only once measuring the initial tire temperature $T_1$ before the vulcanization.

The inventors further have found out that errors might occur between the estimated temperature and the actually measured temperature owing to a variation of tire weight. That is to say, in practice, weights of tires of the same kind might vary about ±3%. Therefore, the actual tire temperature is somewhat varied due to the variation of tire weight. For example, if a tire weight is larger than a standard weight, the temperature increasing rate becomes gentle. In such a case, the parameters $A_1$ and $A_2$ have to be set at values somewhat smaller than those for the standard weight. Therefore, in the preferred embodiment of the controlling method according to the invention, the tire weight is measured before the vulcanization and the parameters $A_1$ and $A_2$ are corrected in response to the measured tire weight, so that it is possible to improve an estimation accuracy. In this case, the correction amount can be determined experimentally and the inventors have confirmed experimentally that sufficient accuracy can be derived by correcting the values of A, and $A_2$ by about ±5%.

FIG. 1 shows the estimated tire temperature at successive sampling times $t_1, t_2 \ldots$ after measuring the initial tire temperature $T_1$ before the vulcanization. According to the invention, the initial temperature $T_1$ is measured by inserting the thermometer into a green tire which may be or may not be set in the vulcanizing chamber. After that, the vulcanizing chamber is closed to start vulcanization at a time $t_0$. As shown in FIG. 1, after vulcanization has been started, the tire temperature is not increased immediately and a lag period L is occurred. This lag period L can be determined experimentally and can be set generally within a range from 10 to 30 minutes, typically 15 minutes. After the lag phase period L, the estimated temperatures $T_2, T_3 \ldots T_{J-1}, T_J$ are successively calculated with a suitable period P. This period P may be generally set within a range from 0.5 to 5 minutes and among them the typical value can be set at one minute. The estimation steps for deriving the successive tire temperatures will be indicated in the following table 1.

TABLE 1

| Time | Tire Temperature | Lapse Time |
|---|---|---|
| $t_1$ | $T_1$ | |
| $t_2$ | $T_2 = A_1 \cdot T_1 + A_2$ | $t_2 = t_1 + P$ |
| $t_3$ | $T_3 = A_1 \cdot T_2 + A_2$ | $t_3 = t_2 + P$ |
| . | . | . |
| . | . | . |
| . | . | . |
| $t_J$ | $T_J = A_1 \cdot T_{J-1} + A_2$ | $t_J = t_{J-1} + P$ |

In the present invention, the successive tire temperatures are estimated as mentioned above after measuring the initial green tire temperature $T_1$ before vulcanization, and further the vulcanizing rates can be calculated on the basis of the estimated temperatures. The sum of products S of the successive vulcanizing rates from the vulcanization start time $t_0$ to a certain time $t_J$ will be described by Arrhenius equation as follows, $$S = \int_0^{t_J} e^{-\frac{E}{R}\left(\frac{1}{T} - \frac{1}{T_0}\right)} \cdot dt \tag{9}$$

where E is an activation energy, R is a gas constant, T is a tire temperature, $T_0$ is a standard temperature and t is a lapse time. From the equation (9), the sum of products S of the vulcanizing rates is obtained as follows.

$$S = \sum_{i=1}^{J} e^{-\frac{E}{R} \cdot \left(\frac{1}{T} - \frac{1}{T_0}\right)} \tag{10}$$

Therefore, the sum of products S of the vulcanizing rates till any time can be obtained by the estimated tire temperature. In order to effect the vulcanization controlling method according to the invention, a time period that the sum of products S of the vulcanization reaches a predetermined value can be estimated by the equation (10), and therefore a vulcanization end signal can be supplied to a vulcanization controlling apparatus after a lapse of this estimated time period so as to stop the vulcanization.

FIG. 2 is a graph showing the tire temperature estimated by the method according to the invention and a relation between the sums of products of the estimated vulcanizing rate and of the actual vulcanizing rate, and abscissa and ordinates axes show the time t and the temperature T together with the sum of products of the vulcanizing rates, respectively. In FIG. 2, a dotted curve A shows the actually measured temperature and a solid curved B illustrates the estimated temperature. In this example, during vulcanization the temperature increasing rate of the heating medium was decreased from a time $t_4$, and the parameters $A_1$ and $A_2$ were calculated again at the time $t_4$. Further in FIG. 2, a dotted curve C represents the sum of products of the actual vulcanizing rates calculated on the basis of the actually measured temperature, and a solid curve D illustrates the sum of products of the estimated vulcanizing rates calculated on the basis of the estimated temperature. As clearly understood from these curved, the tire temperature estimated by the method according to the invention and the sum of products of the estimated vulcanizing rates calculated on the basis of the thus estimated temperature can approximate the actual value by measured values in a highly accurate manner.

FIG. 3 is a schematic view depicting an embodiment of a vulcanizing control apparatus for effecting the method according to the invention. In FIG. 3, a green tire 1 is transported by a belt conveyor 2 into a weighing device 3 at which a weight is measured. Then, a thermometer 4 is inserted into the green tire 1 placed on the weighing device 3 to measure the initial tire temperature. The thus measured temperature is supplied to a computer 5 together with the previously measured tire weight for correcting the parameters. After measurement, the green tire 1 is set in a vulcanizing chamber 6 of a vulcanizing apparatus 7 and then the vulcanizing chamber is closed. In the computer 5, the tire temperature during the vulcanization is estimated by calculating the thus supplied initial tire temperature with the parameters which are previously calculated on the basis of the actually measured tire temperature and are stored in a memory 8. Further, the sum of products of the vulcanizing rates is calculated on the basis of the estimated tire temperature and is compared with the predetermined value to generate the vulcanization end signal. Then, the vulcanization end signal is supplied to a controlling circuit 9 to control the end of the vulcanization of a vulcanizing apparatus 7. In the above embodiment, the initial tire temperature is measured while the green tire is placed on the weighing device, but the temperature measurement may be done after the green tire is set in the vulcanizing chamber, but before closing the chamber.

Hereinafter, a few example for effecting the method according to the invention will be explained.

EXAMPLE I

1. Measure the tire weight before vulcanization, and supply the measured tire weight to the computer.
2. Insert the thermometer into the green tire before vulcanization to measure the initial tire temperature, and supply the measured initial tire temperature to the computer.
3. Close the vulcanizing chamber of the vulcanizing apparatus to start the vulcanization.
4. Estimate the tire temperatures successively on the basis of the initial tire temperature and the tire weight.
5. Estimate the vulcanizing rates successively on the basis of the estimated tire temperatures.
6. Generate the vulcanization end signal to stop the vulcanization when sum of products of the estimated vulcanizing rates reaches the predetermined value.

EXAMPLE II

1. Measure the tire weight before vulcanization, and supply the measured tire weight to the computer.
2. Insert the thermometer into the green tire before vulcanization to measure the initial tire temperature, and supply the measured initial tire temperature to the computer.
3. In the computer, estimate the tire temperature during vulcanization on the basis of the tire weight and the initial tire temperature, and calculate the vulcanizing rates on the basis of the estimated tire temperature to derive the time period when sum of products of the estimated vulcanizing rates reaches the predetermined value.

4. Close the vulcanizing chamber of the vulcanizing apparatus to start the vulcanization, and stop the vulcanization when the thus derived time period elapses.

EXAMPLE III

1. Make the look-up table representing a relation between the vulcanizing time periods obtained by calculating various tire weights and initial tire temperatures, and store it in the memory.

2. Measure the tire weight and the initial tire temperature before vulcanization.

3. Derive the vulcanizing time period from the look-up table corresponding to the tire weight and the initial tire temperature.

4. Close the vulcanizing chamber to start the vulcanization, and stop the vulcanization when the vulcanizing time period elapses.

In the examples II and III mentioned above, since the required vulcanizing time period can be obtained when the measured tire weight and initial tire temperature are supplied to the computer, it is possible to inform the operator of the vulcanizing time period previously and to perform a preparation for the next tire operation at a proper timing. In addition, it is possible to improve an operating efficiency of picking up the tire from the vulcanizing apparatus after vulcanization, and to improve a running efficiency of the whole system.

As mentioned above in detail, the effects of the present invention can be summarized as follows.

(1) Since the tire temperature is not measured during vulcanization, the trace of the thermometer insertion is not remained on the tire surface.

(2) Since the tire temperature is not measured during vulcanization, the vulcanizing apparatus is not complicated in construction and thus it becomes easy to perform thermometer repairing and exchanging operations.

(3) Since the tire temperature is estimated by actually measuring the initial tire temperature before vulcanization, estimation accuracy is improved and thus it is possible to perform the accurate vulcanization.

(4) Since the parameters for use in the calculation of the estimation temperature can be corrected on the basis of the measured tire weight, it is possible to minimize a possible error in the temperature estimation caused by the variation of tire weights and thus it is possible to perform the accurate vulcanization.

(5) Since the required vulcanizing time period can be obtained before the vulcanization, it is possible to know previously the tire picking-up timing after the vulcanization and the preparation timing for the next tire to be vulcanized and thus the working efficiency can be improved.

(6) According to the effects mentioned above, it is possible to decrease the tire manufacturing cost and to improve the tire quality.

What is claimed is:

1. A method for controlling a tire vulcanization of a vulcanizing apparatus comprising the steps of:

measuring an initial temperature of a green tire before vulcanization;

estimating tire temperatures during vulcanization without actually measuring the temperature of the tire during vulcanization, said tire temperatures being successively calculated from the initial tire temperature in accordance with a first order approximation;

calculating a sum of products of vulcanizing rates derived from said estimated tire temperature during vulcanization; and stopping said tire vulcanization when said sum of products of vulcanizing rates becomes equal to a predetermined value.

2. A method according to claim 1, further comprising measuring a weight of the green tire before the vulcanization, and correcting parameters used in said tire temperature estimation on the basis of the measured weight of the green tire.

3. A method according to claim 1, wherein said stopping step comprises deriving a time period when said sum of products of vulcanizing rates reaches the predetermined value; and stopping said tire vulcanization when the thus derived time period elapses.

4. A method according to claim 3, wherein said time period is derived from a look-up table representing a relation between the initial tire temperature and vulcanizing time period.

5. A method according to claim 3, further comprising the step of;

indicating said vulcanizing time period.

6. A method according to claim 1 wherein said step of estimating tire temperatures is initiated after a lag period of 10–30 minutes after the start of vulcanization.

* * * * *